US012483627B2

(12) United States Patent
Alleaume et al.

(10) Patent No.: US 12,483,627 B2
(45) Date of Patent: Nov. 25, 2025

(54) METHOD AND APPARATUS FOR ESTABLISHING A COMMUNICATION BETWEEN A FIRST AND A SECOND COMMUNICATION DEVICE

(71) Applicant: InterDigital CE Patent Holdings, SAS, Paris (FR)

(72) Inventors: Vincent Alleaume, Pace (FR); Pierrick Jouet, Rennes (FR); Anthony Laurent, Vignoc (FR); Caroline Baillard, Saint Sulpice la Foret (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 340 days.

(21) Appl. No.: 18/266,892

(22) PCT Filed: Dec. 14, 2021

(86) PCT No.: PCT/EP2021/085646

§ 371 (c)(1),
(2) Date: Jun. 13, 2023

(87) PCT Pub. No.: WO2022/129017

PCT Pub. Date: Jun. 23, 2022

(65) Prior Publication Data

US 2024/0056503 A1 Feb. 15, 2024

(30) Foreign Application Priority Data

Dec. 15, 2020 (EP) .................................... 20306580

(51) Int. Cl.
*H04L 67/00* (2022.01)
*H04L 67/141* (2022.01)
(Continued)

(52) U.S. Cl.
CPC .......... *H04L 67/141* (2013.01); *H04W 4/023* (2013.01); *H04W 76/14* (2018.02)

(58) Field of Classification Search
CPC ...... H04L 67/141; H04W 76/14; H04W 4/023
See application file for complete search history.

(56) References Cited

U.S. PATENT DOCUMENTS 8,670,597 B2 3/2014 Petrou et al.
11,256,792 B2 2/2022 Tussy et al.
(Continued)

FOREIGN PATENT DOCUMENTS

CN 110691323 A 1/2020
JP 6144849 B1 6/2017

*Primary Examiner* — Erika A Washington
(74) *Attorney, Agent, or Firm* — VOLPE KOENIG

(57) ABSTRACT

A first communication device, e.g., having a camera, is pointed, by a first person, in direction of a second person with which the first person wants to communicate in an interactive session, using his communication device. The camera captures the face of the second person. If the second person does not have a device enabling interaction with the first device, a third person in proximity of the second person, having a device enabling interaction, is selected, and a request is transmitted to the second device in the hands of the third person to handover his device to the second person, displaying, for example, the face of the second person. When handover is detected, the second person may be identified by the device being handed over. The interaction between the first and the second device may be established.

15 Claims, 10 Drawing Sheets

(51) Int. Cl.
*H04W 4/02* (2018.01)
*H04W 76/14* (2018.01)

(56) References Cited

U.S. PATENT DOCUMENTS 11,341,351 B2 5/2022 Resnick et al.
2011/0142016 A1 6/2011 Chatterjee
2012/0294495 A1 11/2012 Wren et al.
2015/0269420 A1 9/2015 Kim et al.
2017/0193303 A1 7/2017 Wexler et al.
2021/0209346 A1* 7/2021 Resnick ............... G06V 10/454
2022/0147604 A1 5/2022 Ozono et al.

* cited by examiner

METHOD AND APPARATUS FOR ESTABLISHING A COMMUNICATION BETWEEN A FIRST AND A SECOND COMMUNICATION DEVICE

CROSS REFERENCE TO RELATED APPLICATIONS

This application is a U.S. National Stage Application under 35 U.S.C. § 371 of International Patent Application No. PCT/EP2021/085646, filed Dec. 14, 2021, which is incorporated herein by reference in its entirety.

This application claims priority to European Application No. 20306580.0, filed Dec. 15, 2020, which is incorporated herein by reference in its entirety.

FIELD

The present disclosure generally relates to the field of communication, and in particular the present disclosure is related to establishing communication between devices and between users of these devices.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

The possibilities for a person to communicate with other persons has made a giant step forward since the introduction of electronic communication means, making it possible to set up (establish) a communication between persons whatever their physical distance. However, the advent of these new communication technologies has also contributed to clustering of the communication between persons based on a common interest (e.g., people are clustered in social networks), and has caused a so-called digital divide, notably between the young and the elderly. Surprisingly, the new communication means have thus created an impoverishment of the more spontaneous encounters and contacts between persons not initially sharing a common interest or not belonging to a same group, and between persons having digital communication means and those persons not having such communication means, or not mastering modern means of communication.

Providing new means to establish a one-to-one person/device exchange that help to overcome these communication barriers may therefore be useful. Limiting the amount of private information required to establish such one-to-one exchange may be a desirable feature.

SUMMARY

According to one aspect of the present disclosure, there are provided methods for establishing a communication between a first and a second communication device according to the described embodiments and appended claims.

According to a further aspect of the present disclosure, embodiments of a device implementing at least one of the methods for establishing a communication between a first and a second communication device are described in the following and claimed in the appended claims.

BRIEF DESCRIPTION OF THE DRAWINGS

More advantages of the present disclosure will appear through the description of particular, non-restricting embodiments. To describe the way the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As mentioned in the background section, providing new ways to establish a one-to-one person/device exchange that help to overcome some communication barriers that exist with current technology may be useful, and limiting the amount of private information required to establish such one-to-one exchange may be a desirable feature.

For example, participants of a short-lived events wherein communication devices are used, may not know each other well initially, or may not even know each other at all. Persons not equipped with a communication device may want to participate in the social event. Examples of such short-lived social event are dating events, town hall meetings, and games. The common denominator between these kinds of events is that they are transitory, and that at least a very large number of participants do not know each other; many of the participants are reluctant about privacy aspects. Further, not all participants may be in the possession of a communication device.

Figure 1A:
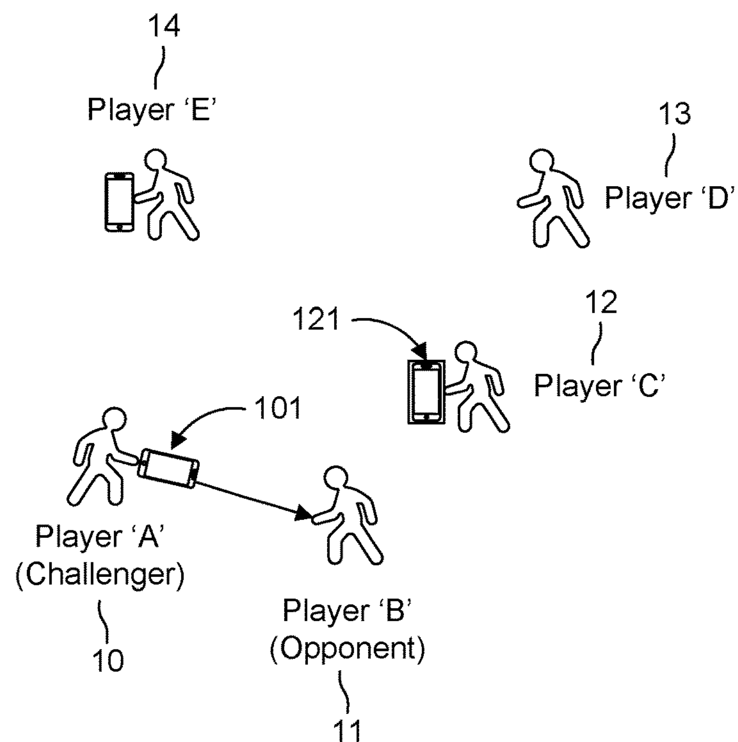
FIG. 1 illustrates an exemplary embodiment of the method of communication.
Figure 1B:
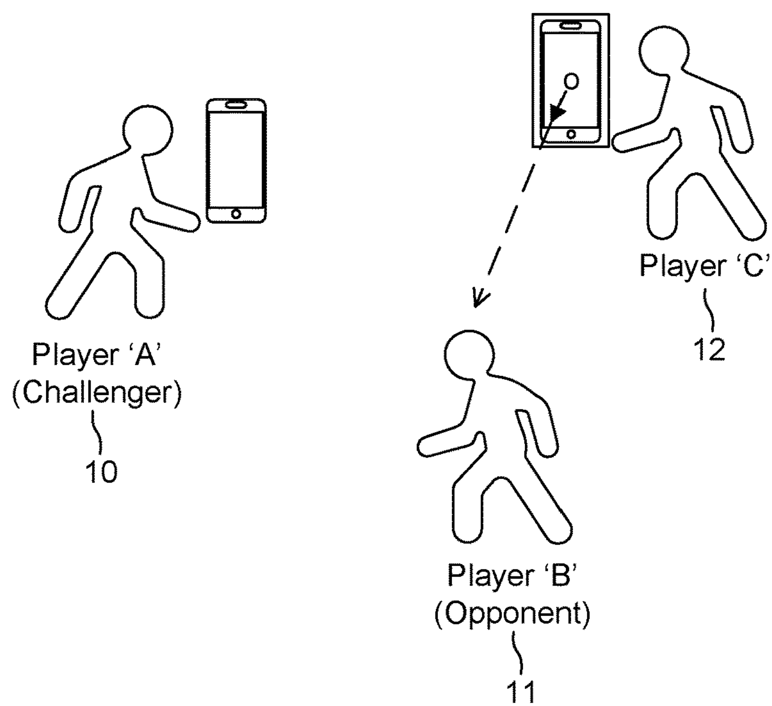

FIGS. 1*a*-*b* illustrates an exemplary embodiment of the method of communication applied to a game or other event.

Taking the game event as a further example to illustrate aspects of the present disclosure, a (family) quiz game, gathering persons ('players'), organized in a team, in a room, e.g., see FIG. 1*a*, players A (10), B (11), C (12), D (13) and E (14). The team includes at least three players (here, five) of which at least two having a communication device (e.g., a smartphone; here, three) executing the quiz application, further referred to as player device (here, players A, C and E have player devices: e.g., player A has device 101, and player C has device 121). The player devices may register each player before starting the game by facial image capturing and the position of each participant (e.g., when the participants sit around a table) may be memorized by the application. The registration may memorize the player's image (face capture), and an identification of the device used by the player (associated player device), such as telephone number, IP or MAC address, IMEI), that allows to communicate with the device. For the players that do not possess a player device (here: players B and D), a player having a player device may pass their device on to these players for registering in the game, before returning the player device to the player from which they have lent it. During the game, each quiz application may communicate with the other participating player's devices in the team, either directly or through a (game) server managing the game session. In the game, a player (challenger) may choose another player ('the (selected) opponent') and challenge the selected opponent to reply to a challenge. The challenger (here: A), in possession of a player device, challenges another player (here: B) by pointing the built-in rear-facing camera of her/his/her player device to the chosen opponent. The opponent is selected when an image of the selected opponent is captured by the challenger's player device, which action may be rendered visible on the challenger's player device. The image may be a cropped image of the face of the opponent, or a wider-angle image possibly having multiple persons on the image, where the challenger indicated the selected opponent with an arrow or circle. The captured image of the opponent may now be transmitted to each of the other player devices (here the player devices of players C and E), with an indication that the player of which the image is displayed is challenged. If the selected opponent has a player device, facial recognition of the selected opponent and matching the image of the selected opponent to the image captured by the challenger unlocks the question, and the opponent is given the opportunity to enter her/his answer. If the selected opponent does not have a player device (which is the case here as player B does not have a player device), one of the other players (except the challenger; e.g., player C or E) may lend her/his player device to the selected opponent (here: player B) of which the image is displayed on the her/his/her player device. The challenge is unlocked when the selected opponent is identified by the player device through facial recognition (here: when the borrowed player device is in the hands of player B) and the opponent is given an opportunity to reply to the challenge. Thereafter, the opponent may return the player device to the player from which the opponent borrowed it (here: to C or to E).

According to an embodiment, instead of, as described previously, transmitting the image of the selected opponent to all other player devices than the one of the challenger (here: to players C and E), the image may be transmitted to a selected player having a player device and being in close or nearest proximity of the selected opponent (here: player C). This embodiment may be supported by the initial registration phase, as it may be known therefrom where each player is located (e.g., is sitting) and, which are the players being located closest (next) to the selected opponent, and it may be determined from facial recognition which of these closest players has a player device. The selected player is then the closest player to the opponent and having a player device.

According to an embodiment, instead of, in addition to, as described previously, transmitting the image of the selected opponent to indicate to the player devices other than the challenger's player device the selected opponent, a name of the opponent may be transmitted to these devices and shown on these devices. The name may correspond to the opponent's name as registered in the game (here: 'B').

According to an embodiment, instead of, or in addition to, transmitting the image of the selected opponent, an image may be transmitted including several players, with an indication (e.g., an arrow, or surrounding circle) corresponding to the selected opponent.

According to a further embodiment, the player devices may receive information about the position of the selected opponent, and may display, based on this information, the location of the selected opponent. Again, this embodiment may be supported by the initial registration phase, as it may be known therefrom where each player is located (sitting) and, which are the players having a player device as determined from facial recognition, and what is their location relative to the selected opponent.

According to a further embodiment, the location of the selected opponent is indicated through an arrow pointing in the direction of the selected opponent; see FIG. 1*b*. The directional arrow or finger may be oriented to point in the right direction according to the orientation of the player device on which the arrow or finger is displayed, using a built-in Inertial Measurement Unit (IMU) and/or a digital compass. According to an embodiment, the location of the selected opponent is indicated through textual information, such as 'the selected opponent is the player to your left'.

The above embodiments may be combined in a particular advantageous embodiment.

Figure 2:
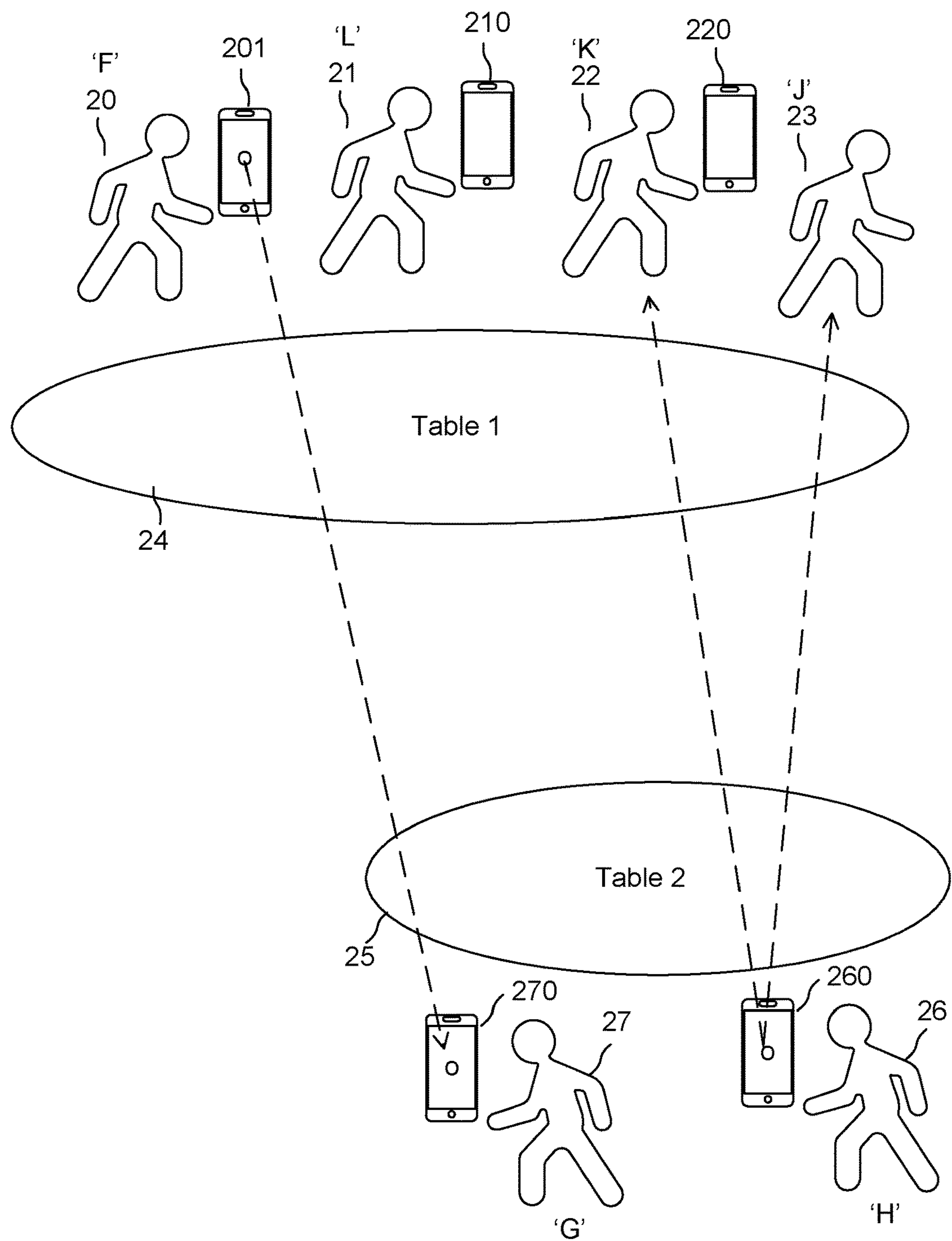
FIG. 2 takes a dating event as a further example to illustrate aspects of the present disclosure.

FIG. 2, takes a dating event as a further example to illustrate aspects of the present disclosure. The dating event is a typical short-lived event, taking place in a large room or hall, where most of the participants do not know each other and are placed in groups from 2 to n persons around tables of various sizes. All groups have at least one more participant equipped with a communication device (e.g., a smartphone) with an application according to an embodiment ('dating application'), and the dating application is capable of communicating with other communication devices of other participants also having the same dating application, either directly or through a dedicated server. The server may be, for example, a home or office gateway, a WiFi or 3GPP Access Point (AP) or a Point of Access (PoA). Previously, in a registration phase, participants may have registered their face and associated their face with their device if they have a device with the dating application. The device may be identified for example by a telephone number, an IP address, a MAC address, an IMEI, that allows to set up (establish) a communication with the device.

At some point, the participant F (reference 20) ('inviter') of table 1 (reference 24) wants to invite participant G (reference 27) ('Invitee') sitting in sight of view at table 2 (reference 25), to a one-to-one or face-to-face communication session. Participant F (20) has a device 201, Participant L (21) has a device 210, participant K (22) has a device 220, Participant J (23 has no device, participant G (27) has device 270, and participant H (26) has device 260. Participant F (20) may therefore point the rear-facing camera of her/his device in the direction of the participant G (27) and takes an image of G (27). This action triggers a request for exchange through the dating application; the device to send the request to is identified by the image of G (27) taken by participant F (20), which image is matched to the registered images; if a match is found, the identification of the associated device of participant G (27) is retrieved. The targeted participant G (27) is notified via her/his/her identified device, possibly a picture of F (20) (e.g., the initially registered image of F (20)) is displayed with a message of F (20), and G (27) may respond (postpone, accept, or decline) to the proposed interaction with F (20).

Another participant H (26) may invite participant J (23) for a more personal communication session by pointing the camera of her/his/her device to a participant J (23); however, J (23) does not have a device, or J's (23) device is not running the dating application. This information can be retrieved from the initial registration of the participants. The participant closest to J (23), in distance, and/or direction and whose face was captured when participant H (26) took an image of J (23)) having a device running the dating application is identified as participant K (22) based on the initial registration. Participant K (22) is sent a request to pass her/his device (220) on to J (23), next to its location ('pass-on request'); the request may be accompanied by a picture of J (23). Participant K (22) may postpone, accept or decline the request. If K (22) accepts the request, he passes her/his device (220) on to J (23), and once J (23) has been identified as being indeed J by taking a picture of J (23) with the front-faced camera of the device (220) and matching it, the invitation of H (26) is unblocked, and J (23) may postpone, accept or decline the invitation. If however K (22) does not reply positively to the pass-on request, a next pass-on request may be transmitted to another participant L (21) next to J (23), and so on.

Now taking the town-hall event as a further example to illustrate aspects of the present disclosure, a town-hall event is another kind of short-lived event, where a selected number of presenters invite people to a presentation on one or more subjects, and the invited people have an opportunity to ask questions to the presenters. The invitees may know the speakers, but the speakers may not know every invitee. As previously, the invitees may register for the town-hall event by providing a picture, and possibly an identification of a device running an application according to an embodiment. The identification may be for example a telephone number or an IP address, a MAC address (or any other identifier that allows to set up (establish) a communication with the device), that may be automatically memorized when registering for the town hall event. During the town hall event, an invitee may raise her/his hand, to ask a question to one of the speakers. One of the speakers may point her/his device to the invitee raising her/his hand, take a picture of the invitee. Based on the registration, the image of the invitee raising her/his hand may be matched to the faces of the registered invitees as recorded in the registration data. If there is a match, the device associated with the invitee is retrieved, if there is such an associated device. The town-hall event application unblocks the device of the invitee if the invitee's image of her/his face, taken by a front-facing camera of the invitee's device, matches to the face in the registration data corresponding to the device. When the device is unblocked, the invitee may speak in the microphone of her/his device to ask her/his question, where the sound from by her/his microphone is transmitted to the town hall sound system.

If there is no device associated, the faces of invitees next to the invitee raising her/his hand are matched to the registered faces of the registration, and these are matched to the registered data. If a match is found and there is an associated device, a request is sent to the associated device to hand over (to hand on, to pass on, to transfer) the device to the invitee of which a picture is shown on the device. The owner of the associated device may accept or refuse the pass-on request. If the owner of the associated device accepts the pass-on request, the device is unlocked when an image capture done by the passed-on device matches to the face, as recorded in the registration data, of the invitee raising her/his hand, and then the device is unlocked so that the invitee may ask her/his question.

According to an embodiment, instead of using personal devices, or in addition to using personal devices, a pool of ready-to-use devices may be rendered available for use by the participants (e.g. in the game, dating application, or town hall event). Interested persons may pick up such ready-to-use device for the duration of their participation and may enter a pseudo name for improved privacy. According to an embodiment, participants may wear one of a set of unique face masks for further improved privacy when participating; the registration is in that case done while wearing the face mask, and the face mask is kept throughout the game, dating or town-hall session.

The application of the teachings of the present disclosure to the discussed game, dating or town-hall applications are of course mere examples that are selected for a purpose of explanation. The reader of the present document will readily understand that the present principles are not limited to the examples given.

The notion behind the teachings of the present disclosure can be expressed as that of a 'proxy face'. Instead of letting a user point and select entries through a list of names (the list possibly including photos, description, . . . ), the user may use her/his communication device and point it in her/his environment to a real, or even virtual, face of a person in line of sight. It allows interacting with others in a natural yet original approach, suitable example for application in a Mixed Reality environment context, where location and spatial layout of real and virtual persons matters.

The table below depicts a high-level overview of some functions identified to implement the embodiments discussed further on in this document (referred to as S0, S1 and S2). The functionalities using device localization information (last 2 lines at bottom on the table) are for S1 and S2 embodiment(s) that extend functionalities of the more simple system S0 (see details and difference further on in the document).

| Local function (user communication device level) | Global function (system level); single server or distributed architecture (e.g. P2P) |
|---|---|
| User face detection, User face characterization (features extraction) User (+face features) + device (un)registration | User(s) face features (un)registration User(s) device (un)registration Registration data (e.g. participant record and associated device if any). |
| Other user face detection Other user identification | Active user(s) management Active device(s) management Face user global identification User proximity management (devices/faces) Closest user identification Closest user notification Closest user pass-on request management |
| Device localization (in a scene) | Device global localization (in the scene) |
| User(s) selection based on user localization (in a scene) | User filtering based on global localization (in the scene) |

Interactive Session ('Session') Management

According to an embodiment, a dedicated server is used for management of an interactive session (that is, e.g., a game, dating or town hall event). According to the embodiment, the server centralizes the management of the interactive session and the related processing as well as notifications destined to users that join and that leave the session. According to a different embodiment, the server functions are implemented on a distributed architecture, using a peer-to-peer (P2P) approach for instance.

Scene of the Interactive Session ('Session Scene' or 'Scene')

The spatial area and layout where an interactive session is taking place as further referred to as a 'scene' or 'session scene'). A scene may be typically be a room or office area, compatible with the interactive session communication requirements, that is: the devices involved in a session should be able to communicate with each other or (via) a related server, if any. In a same session scene are gathered collocated participants in a session plus their devices. A session scene may be a limited to an area if that is relevant for the purpose of the session or scenario used (museum area, playground, . . . ).

According to an embodiment, the session scene is a real-world location, and the participants in the session being real persons gathered in that location. According to a different embodiment, a session scene is a virtual place, and the participants in the session are virtual too. According to the latter embodiment, the scene may be a specific virtual location in a virtual world, where users represented by unique avatars (with unique faces) meet and behave as a real persons. Then, the communication devices used by avatars may be virtual too, and even may provide similar functionalities as real communication devices, such as capturing of image(s) through a built-in front or rear virtual camera, from the avatar's virtual location and virtual point of view.

Joining and Leaving a Session

According to an embodiment, some users may join a session (a user that has joined a session is further referred to as 'participant') with or without an associated 'own' communication device, during a (preliminary) registration phase. Participants that registered with an associated communication device ('first participants') may lend (pass-on) a communication device from a participant not having an associated communication device ('second participants'), through a process of temporary linkage between the second participant and the communication device of the first participant, which temporary linkage is undone when the second participant returns the communication device of the first participant to the first participant.

According to another embodiment, a set of communication devices is provided for participants by the organizer of the session, and any person wishing to join the session (to participate in the session) may then pick up a communication device from this set and then use it for the participation duration. The available communication devices may be preconfigured with a dedicated application and/or dedicated settings (such as, preconfigured for a particular type of session, e.g., a dating session, a town hall session), and registering a user and joining a session may be as simple as pressing a button on the communication device.

According to an embodiment, a not-yet registered participant (e.g. participant B) may borrow (may be passed-on) a communication device associated with a registered participant e.g., participant C) and may explicitly request to temporarily join the session with the borrowed communication device, register for the duration of the borrowing, until giving back the communication device to the participant C, and participant B (automatically) unregisters as the device is given back to participant C. According to this embodiment, a participant record for participant B may be created in the registration data for the duration of the registering and unregistering, as for any other participant.

According to an embodiment, for the sake of session management, participants and/or associated device(s) may be removed from a session (and their data may be deleted from the registration data), for instance in the following cases:

- 'Automatic' participant un-registration from a session is done:
  - after a delay (period) of non-participation or inactivity (no action, no request)
    - the participant's record is removed from the registration data, including removal of any association to a device
  - after a delay of a registered user being not associated with any of the devices that are registered as being associated with a participant
    - the participant's record is removed from the registration data
- 'Automatic' device un-registration from a session is done:
  - after a period of unreachability of a registered device and/or
  - when a registered device leaves the session area
    - any related association to registered participants is then removed from the registration data.

Identification Management with Unique Identifiers

A session involves participants, communication devices, and association between these devices and at least some of the participants (temporarily, i.e., for only a period of the duration of the session, or permanently, i.e., for the full duration of the session).

More precisely, a device initially associated with an initial participant (its owner for instance) may be temporarily associated with a second participant, i.e., a participant registered as not having an associated device.

Participants and devices may explicitly join and leave an interactive session at any time, and, according to an embodiment that is alternative to the previously mentioned embodiments, may still remain uniquely identifiable for the session application during the duration of the session, when the records of these no-longer-participants are not removed from the registration data as they leave the session, but are merely flagged (marked) as non-participant when they leave the session. Doing so, at any time during the session, these users may rejoin the session without re-registering, which re-joining has the effect of the non-participant flagging (marking) in the registration data being undone.

According to embodiments, to ensure a unique user identification during the lifetime (duration) of the session:

As an instance of the interactive session application is launched on a (future participant's) device, it may first collect (e.g., on the device) information enabling device and participant characterization for unique identification as part of participant registration. Participant registration and participant un-registration may also be done at any time during the lifetime of the session.

1) Regarding a (future) participant, the collected information may include any of:
   - the (future) participant's face view as a face image or a set of face images, the (set of) face image(s) may be taken by front-facing camera of the device;
   - features extracted from these face image(s);
   - participant pseudo or nickname to be used for the session (if not unique, uniqueness may be enforced if required);
2) Regarding an associated device, the collected information may include any of:
   - a unique device identifier (e.g., Serial Number, IP address, MAC Address, IMEI, telephone number);
   - device pseudo or nickname (if not unique, uniqueness may be enforced if required);
   - device's rear-facing camera image(s) of the scene (recommended in case the device's pose estimation is done by server, see further on).

User Identification

Each participant in a session needs to be uniquely characterizable in terms of participant's features obtained via device sensor(s).

According to an embodiment, front- and/or rear-facing camera(s) of the devices involved in the session are used to extract unique visual features of a participants' face (or face mask as will be discussed further on). These extracted unique features serve as a signature for user identification and face recognition. The unique face signature allows using faces as proxies for triggering interactions between participants (giving the 'Proxy Face' invention name). The mentioned visual features may be, for example, according to SIFT, SURF, or/and variants or other image-based features, or a combination of these. As mentioned, each participant may wear a unique mask for improved confidentiality, and to ensure uniqueness, these masks may be provided for the duration of the session by the session organizer. It may even be possible for participants to register several times under different identities, e.g., by changing the face mask and registering if not already done with the changed face mask, or by removing the face mask and registering if not already done without the face mask.

Embodiment S0

According to an embodiment, when a user registers as a participant to a session, his own device (the unique identifier of the device), if the user brings such device with her/him for use in the session, is associated to the participant, together with information for later identification of the participant, such as pseudo, face image and/or extracted face features. Users that to not bring in an own device, or that do not want (e.g., for privacy reasons) to register with their own device may register with a device provided by the session organizers, or, alternatively, may not register with a device, but only have their identification recorded in the registration data; for this purpose, an image of the face of these participants may be taken (e.g., by a camera device at a reception desk), face features extracted, and this information may be recorded (stored) in the session registration data, together with, for example, a pseudo, and an indication that the participant has no associated device.

For participants registering with a device, the participant to the session is holding the device that is going to be associated with the participant, and face information of the participant may be extracted by processing image(s) taken by the front-facing camera of the device. The image(s) may be taken as the session application is started, or upon an explicit session joining action of the participant.

According to an embodiment, the un-registering of participants and associated device(s), is performed when a participant leaves an interactive session, and any registration data related to the participant (face features, face images, participant pseudo), may be deleted for improved privacy.

Figure 3:
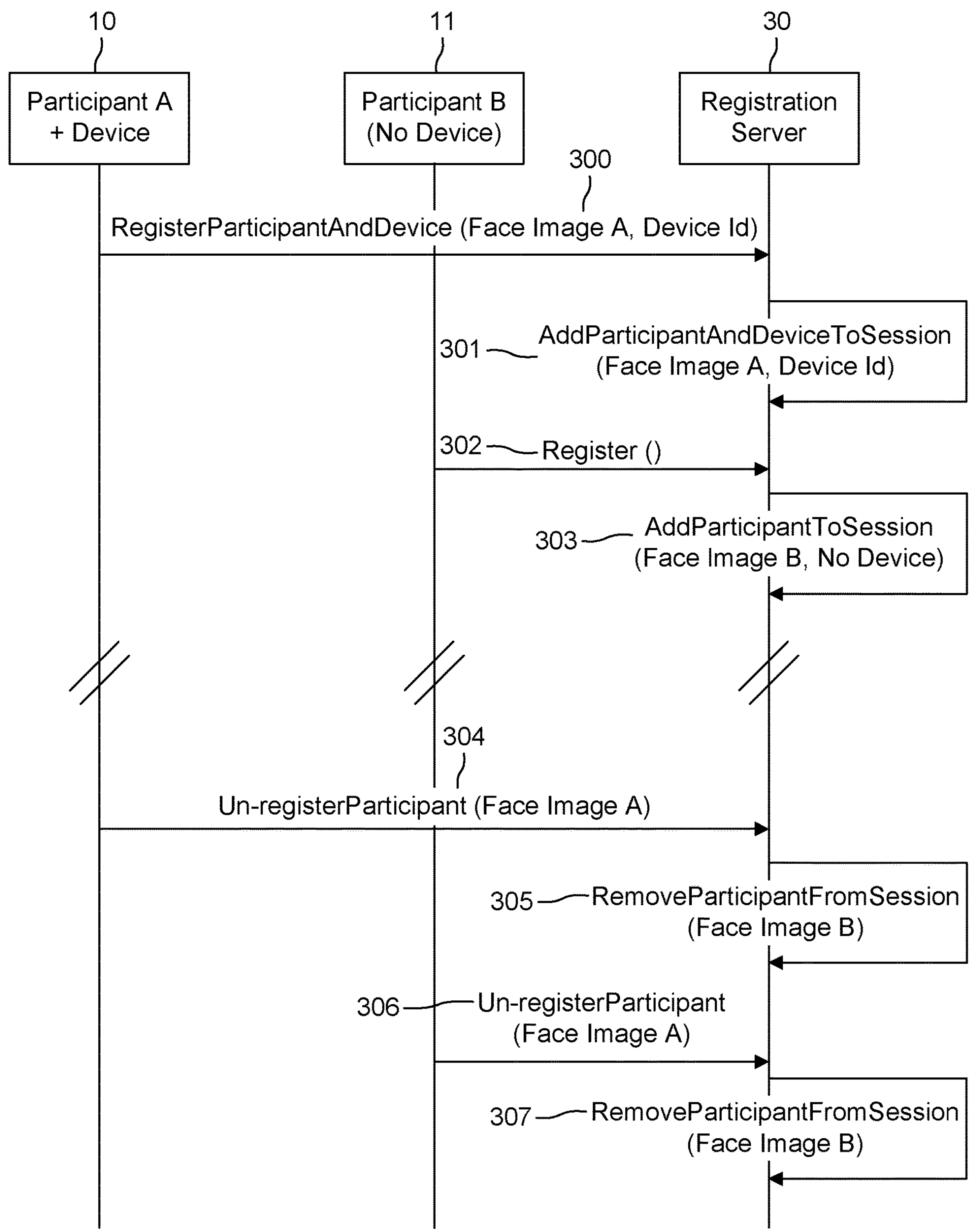
FIG. 3 is a sequence chart of session registration and un-registration for devices and participants to an interactive session.

See FIG. 3. A participant A (10) has a device (either she/he brings in her/his own device or he picks one of the devices provided for the purpose of the session by the session organizer). A participant B (11) did not bring a device, and there are no devices provided for the purpose of the session by the session organizer, or the participant B does, at this stage, not want to use a device. A server 30 performs registration of participants. In 300, Participant A issues a request for registration via his device, which is transmitted to registration server 30. The request 300 includes an image of the face of A, taken by participant's front-facing camera on his device, and a unique ID of the device that participant A is using (the unique ID enabling to set up (establish) a communication with the device; a telephone number). The registration server, receiving request 300, records (stores), in 301, the face image of A and stores the associated unique device ID. The server 30 may extract face features from the face image of A and store these face features together with the image of A and the device ID. Alternatively, the device A may transmit to server 30 the extracted face features of A together with the face image of A and the device ID. In 302, a participant B (11) who has no associated device, requests registration to the registration server 30. The registration server 30, which includes a camera device, takes a picture of B and stores it, in 303, together with information representative of the absence of an associated device for B, and possibly performs a face image feature extraction and stores the result together with the other information relating to B.

The session proceeds (illustrated by double slashes).

In 304, participant A unregisters using his device, and transmits an unregister request to server 30. The unregister request includes the face image of A (and/or the face features of A). In 305, the server 30 deletes the information stored for A, identified by the face image/the face features of A. Alternatively, the face image/extracted face features of A may be kept during the duration of the session, which is useful when A wants to participate again during the session.

In 306, participant B unregisters at the registration desk, or using a device lent by another participant (e.g., C). The camera device at the registration desk or on the device lent by the other participant captures the face of B and transmits the face image and/or face features of B to the server 30. The server 30 recognizes B based on a comparing the images stored with the image received (and/or the face features stored with the face features received) and removes the information related to B. Alternatively, as mentioned previously, the face image/extracted face features of B may be kept during the duration of the session, which is useful when B wants to participate again during the session.

Figure 4:
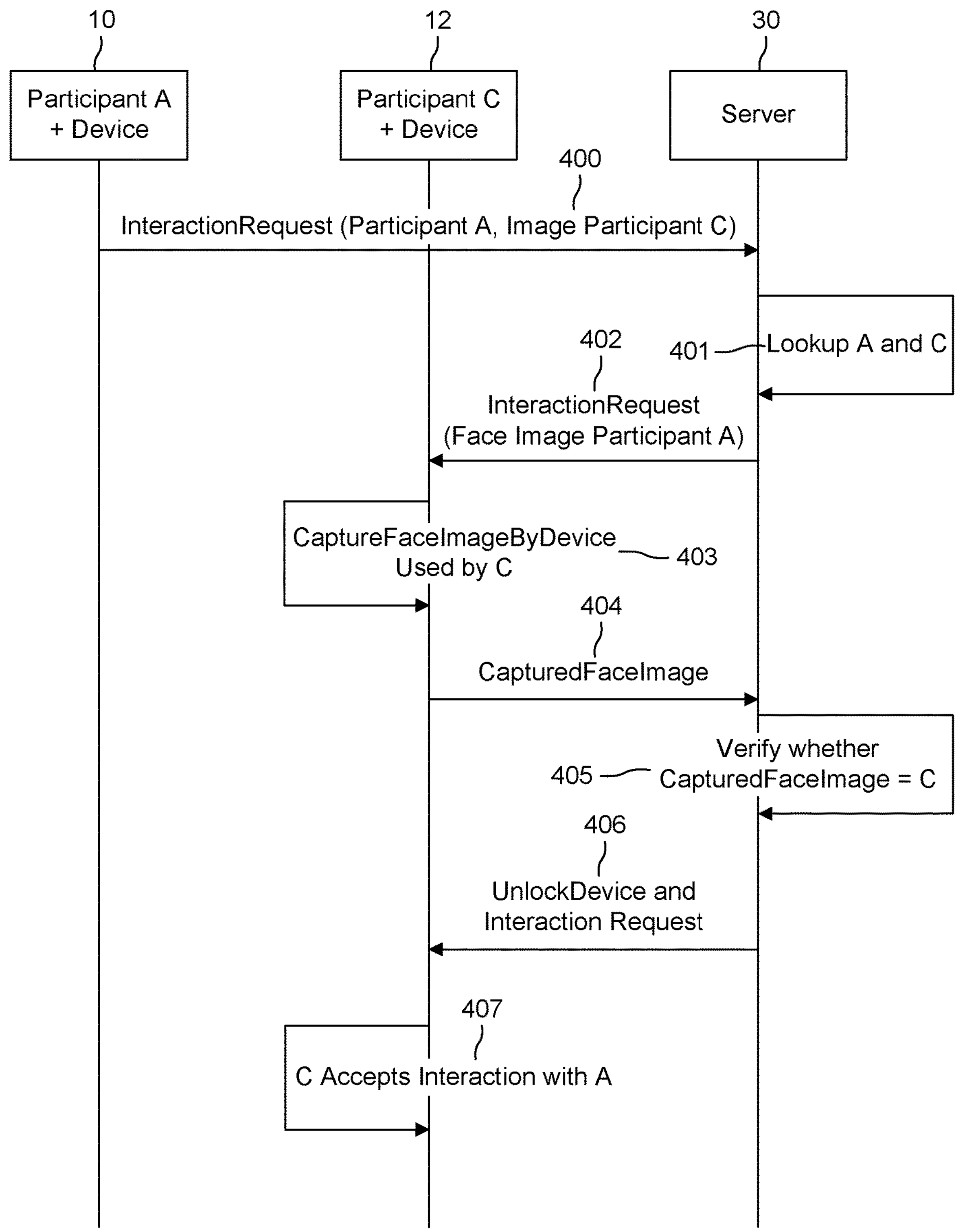
FIG. 4 is a sequence chart of interactivity establishment during a session.

The registration process enables participants to trigger interactions with other users by simply pointing the camera of their device (or the borrowed device) to another participant that is in line of sight, capture the other participant's face, and send an interaction request (this may be done automatically when the face of the other participant is captured). The mechanism behind this is, according to an embodiment, that the image captured by the inviter is transmitted to the server, the server recognizes the invitee, and the server transmits, to the device of the invitee (as associated to the invitee, the association may be temporarily if the device of the invitee was borrowed from another participant), the stored face image of the inviter. This process is illustrated in FIG. 4. In 400, participant A (10) transmits an interaction request to server 30, destined to participant C (both A and C have an associated device recorded in the registration data residing in the server). The request includes an image of C captured by participant A when she/he pointed the camera of his device to C. The server looks up, 401, A (lookup may be based on the device id of participant A, or a face image of A captured by the device used by A when she/he captured the image of C) and C (based on the image of C captured by A), and finds the device associated with C. Following this, server 30 sends, 402, an interaction request to participant C, together with the stored face image of A. According to embodiment, to ensure that the device to which the interaction request is sent is really used by C, the device C, upon receiving the interaction request, captures, 403, the face image of the user of C and transmits it (and/or any extracted face features) back to the server, 404. The server, in 405, verifies, based on the captured image and/or face features received, whether the image/face features correspond to that of the image/face features that it has stored for user C. The server may also extract itself the face features. If there is a match, the server transmits, in 406, an unlock to the device used by C, which unlocks the interaction request. Alternatively, the interaction request may only be sent now and not in 402; in that case, 402 may be merely a request from the server to participant C's device to capture an image of the user of participant C's device and to return it to the server in step 404. When the device used by participant C is unlocked, the device used by C displays the image of A, and the participant C may decide to accept the interaction request from A or not. If C accepts, the interaction can take place, either via the server, or directly as a one-to-one connection set up between A's and C's devices.

Figure 5:
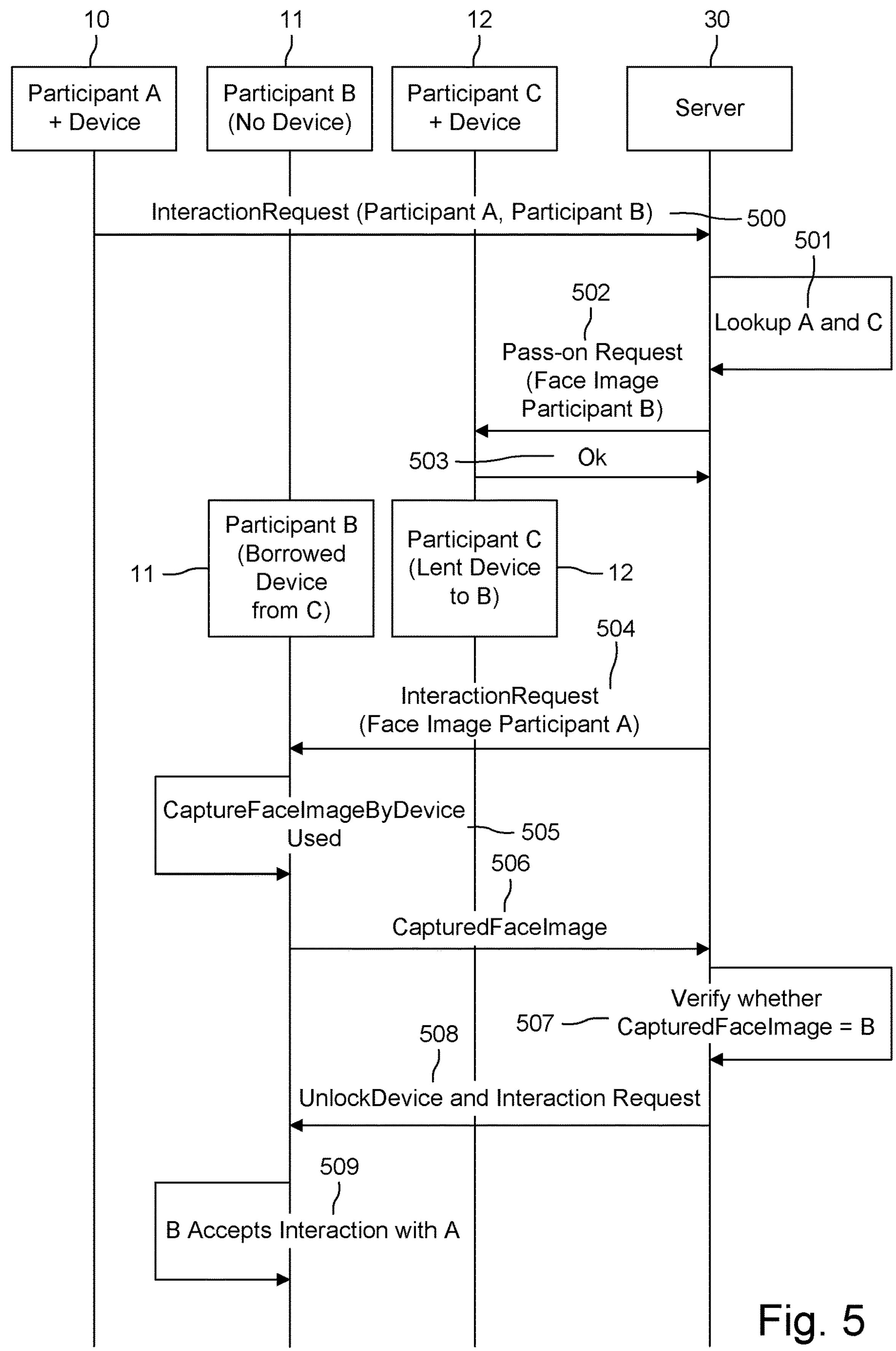
FIG. 5 is a further sequence chart of interactivity establishment during a session.

FIG. 5 illustrates an embodiment of an interaction attempt between a participant A having a device and a participant B not having a device, but sitting next to participant C having a device which B can borrow. In a step 500, participant A sends an interaction request for interaction with participant B to server 30. The interaction request may include the identification of participant A (face image, or device ID), and an image of B taken via a camera capture of A's device. The server looks up A and B similar to as explained for FIG. 4. Here, as B has no associated device, the server seeks for a participant located next to B. This can be done in different ways; if each participant has a fixed location (e.g., each participant sits at a designated place and does not move from that place during the session), the server may find the participant that is nearest to B and who has an associated device that can be borrowed by B, as the server 'knows' the location of each participant. If the participants have no fixed location or are allowed to move, the search for a nearest participant having a device which can be borrowed may be performed based on the image of C provided by A, if the image is a wider-angle image on which several participants can be identified by the server. Either way, the server may identify participant C as being the closest to B. Following this, the server sends a pass-on request 502, including the face image of B. The device used by C displays the image of B and the pass-on request. If C accepts the request (ok, 503), she/he passes her/his device on to B. B has now the device borrowed from C. The server now sends, 504, an interaction request to the device of C, borrowed by B. The request includes the face image of A. According to embodiment, to ensure that the device to which the interaction request is sent is really used by B, the device borrowed by B, upon receiving the interaction request, captures, 505, the face image of the user of the borrowed device and transmits it (and/or any extracted face features) back to the server, 506. The server, in 507, verifies, based on the captured image and/or face features received, whether the image/face features correspond to that of the image/face features that it has stored for user B. The server may also extract itself the face features. If there is a match, the server transmits, in 508, an unlock to the device used by B, which unlocks the interaction request. Alternatively, the interaction request may only be sent now and not in 504; in that case, 504 may be merely a request from the server to participant C's device to capture an image of the user of participant C's device and to return it to the server in step 506. When the device used by participant B is unlocked, the device used by B displays the image of A, and the participant B may decide to accept the interaction request from A or not. If B accepts, the interaction can take place, either via the server, or directly as a one-to-one connection set up between A's and B's devices. After the interaction (not shown), participant B will return the borrowed device to C.

Participant Identification Managed Locally on Participant Devices (P2P)

According to an embodiment, user identification is managed locally on participant devices. The face detection and identification management may then be achieved locally on these devices, using for instance the following exchanges between device(s) and the session management; the latter being implemented by a (distributed) server:

- When a new device is registering to the session, its current user's information (face features, . . . ) is registered too;
- An accessibility link item of information is created, explicitly linking the device ID and its user ID;
- The newly registered (face) user information plus related accessibility link is then forwarded to any other devices already in the session, which that in turn stores the information.

Then, if some interaction is wished between session participants (or between a session participant and a not yet registered participant), i.e., between a 'inviter' participant and an 'invitee' participant, then the following steps may be applied (referred hereunder as (A) and (B)).

Figure 6:
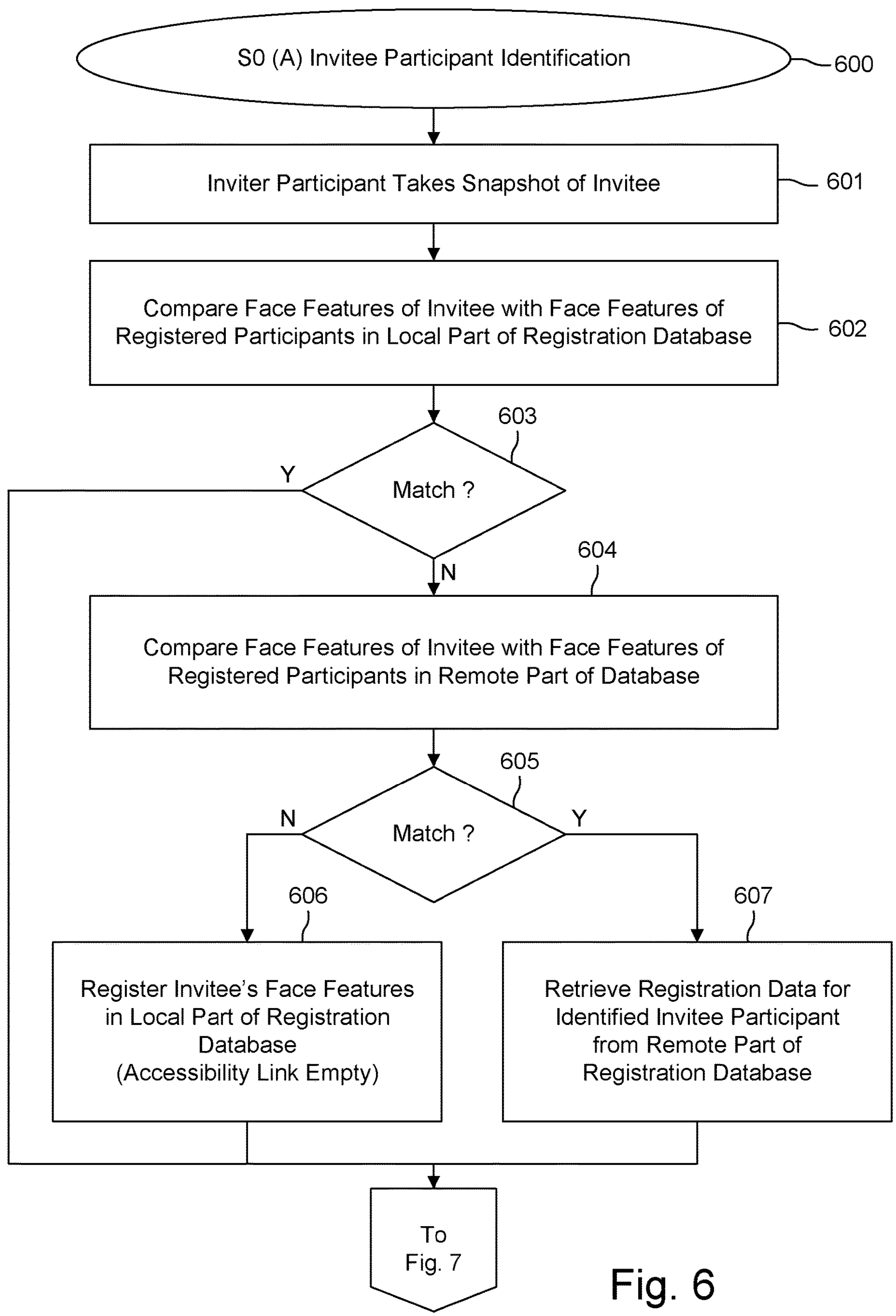
FIG. 6 is a flow chart of invitee identification.

(A) Invitee Participant Identification:

See FIG. 6. When an inviter participant having a device is attempting to trigger an interaction by pointing its device rear-facing camera to a person (that person registered participant or not) in view of the camera and close enough to get its face being detected, then the device takes at least one image(s) (snapshot(s)) of the face of that person, 601, and compares, 602, face extracted features of the at least one image with its locally stored database of already registered participants. If a match is found (603—Yes) and the invitee is thus identified, then the notification attempt process is engaged, see (B) below. If there is a match (603—Yes) then the process continues with checking if the information retrieved from the registration database includes an accessibility link to contact the invitee (see FIG. 7). If there is no match (603—No), the face features from the image(s) taken by the inviter's device are compared, 604, with the face features of registered participants in the remote part of the registration database (the remote part residing on the other participant's devices because the registration database is distributed). It may be likely that the invitee is already registered on his own device form example, if the invitee has an own device. If there is a match, 605—Yes, the registration data for the identified invitee is retrieved, 607, from the registration database (e.g., image, accessibility link), and the process continues with checking if the information retrieved from the registration database includes an accessibility link to contact the invitee (see FIG. 7). If there is no match (605—No), then the invitee's face features and image(s) is registered locally in the local part of the distributed registration database, 606, with an empty accessibility link, and the process continues with checking if the information retrieved from the registration database includes an accessibility link to contact the invitee (see FIG. 7). The notification process is now started, see (B) below.

Figure 7:
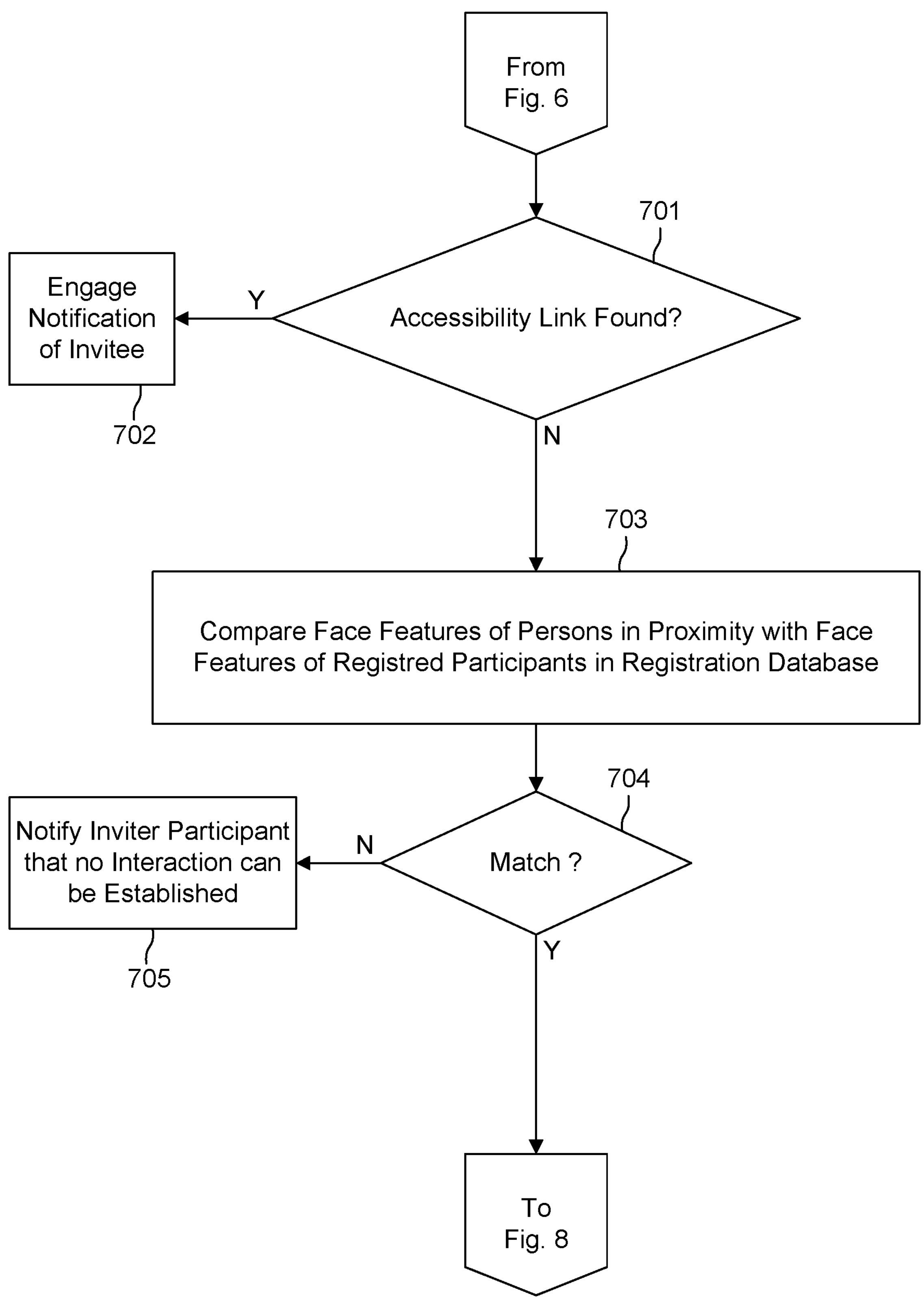
FIG. 7 is a flow chart of invitee notification.
Figure 8:
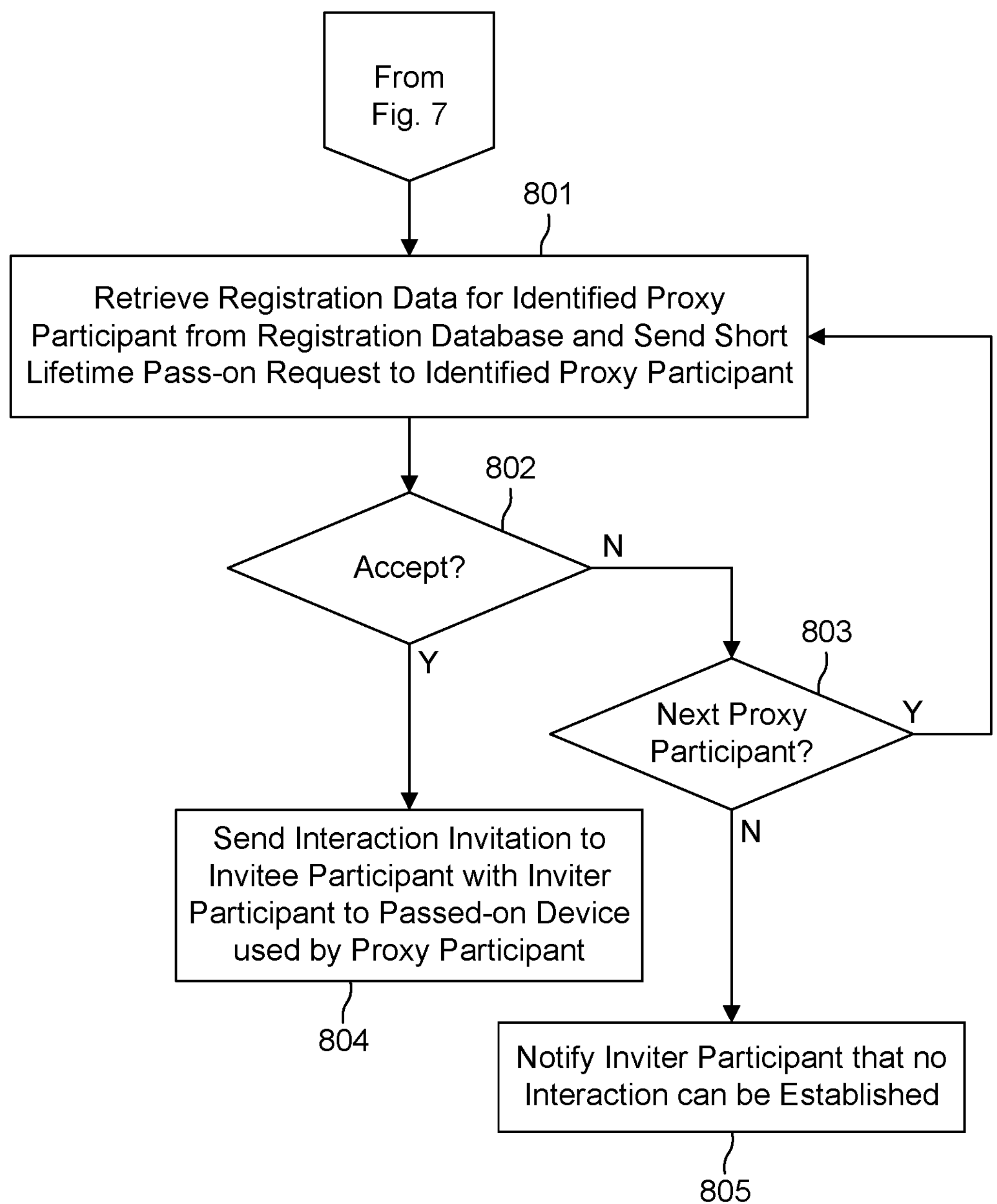
FIG. 8 is a continuation of the flow chart of FIG. 6.

(B) Invitee Notification Process:

See FIG. 7, if a related accessibility link is found (701—Yes), indicating that there is an identifier of a device for notifying the invitee participant, then the notification process is engaged, 702, using that device. If an empty accessibility link is found (701—No), meaning that the invitee participant is not equipped with a registered device at this moment (has no associated device), then, the image(s), taken by the inviter's device, which are not cropped to the face of the invitee participant is/are analyzed to identify any registered participant—equipped with registered device—who is in proximity (e.g., sitting next to) of the invitee. To do so, the face features of the persons in proximity of the target participant are searched for, 703, in the registration database (first locally, then remotely if not found locally as explained previously with regard to the target participant identification). If none found (704—No), the inviter participant is notified that no interaction is possible with the targeted person at this time. According to a further embodiment, if the proximity search did not come up with a participant in proximity of the targeted participant, a search may be done for participants not in proximity, until one is found (or not). If one—or more—corresponding participants(s) is (are) found (704—Yes), then the process continues in FIG. 8. In the search for proxy participants, priority may be given to proxy participants having devices not currently engaged in an interaction with another participant. The registration data is retrieved from the registration database, 801, for the identified proxy participant and a short lifetime pass-on request is sent to the proxy participant together with the face image of the invitee. Information about the inviter identity may be kept hidden until the invitee participant has the passed-on device in her/his hands (for privacy) and has optionally formally been identified as being the invitee (based on, for example matching a face image/face features (taken using the passed-on device front-facing camera) of the person to which the device is passed-on with the face image/face features of the invitee as known in the registration database). If the proxy participant accepts to lend his device to the invitee (802—Yes), the interaction invitation may be sent to the invitee, 804. If the invitee accepts (not shown) the invitation for interaction with the inviter, a sub-session (one-to-one interaction, not shown) between the inviter and the invitee may be started. During the period of the lifetime of the sub session, the accessibility link in the invitee's participant identification information in the registration database may is updated. During that period, the device may be associated with two participants, the temporary one being active (the invitee, who borrowed the device), while the proxy participant (the participant that passed-on his device to the invitee) is inactive. Any other notification or request targeting the participant that passed-on (lent) his device may be delayed until the end of the sub-session, depending on the status (active or inactive) of the participant that passed-on his device. If the proxy participant refuses, or ignores, or takes too much time to reach the target participant (802—No), or if the target participant identity check step fails (not shown), then the next proxy participant is searched (803—Yes) and the process reiterates with step 801, until no further proxy participant can be found (803—No), and then the process ends by notifying the inviter that the invitee cannot be reached, 805. After the sub-session the device is given back to its owner (lender/proxy participant) after the temporary use of the proxy participant's device has terminated (e.g., the notification is cleared, or the inviter or the invitee triggered the closure of the sub session). The end of the sub-session may be verified by a step where the again the front-facing camera of the returned device captures an image of its current participant, and when it matches that of the proxy participant. Once the sub-session has ended, the accessibility link in the registration database related to the invitee is set back to its initial status (empty).

Participant Identification Delegated or Achieved in Centralized Means (Server)

According to another embodiment, the face detection and identification management may be partially or fully delegated to the session management running on a (distributed) server, such that registering/registered devices may simply provide an image taken from front- or rear-facing camera (depending on the step being processed), and in turn the session management may partially or totally:

- Take in charge the face image analysis and characterizing features extraction (for identification).
- Manage the (un)registering of participants(s) based on provided face(s) images or features.

The steps to setup interaction between participants may then be similar to the steps discussed previously for locally managed participant identification, except that all participant identification and accessibility link management may be done in a (distributed) server.

Multiple Locations Embodiment

According to another embodiment, multiple users may be distributed across multiple physical locations, where the multiple users may be communicating using a video conferencing system or other suitable visual communication system. A first user at a first location may use a mobile communication device to capture images of other users at the first location in order to identify the other local users and to initiate interactions with such local users. Such interaction may use any of the techniques described herein for a single physical location. Alternately, the first user may use the camera of the mobile communication device to capture images of users at other (e.g. remote) locations who are in communication with the first location using a video conferencing system or another visual communication system. For example, the first user may point the camera of the mobile communication device at a video conferencing screen to capture an image of a second user at a second location, wherein the second user is communicating with the first user via the video conferencing system. In this way, the second user may be identified based on the captured facial image of the second user. This may be done as previously described, by comparing features of the captured facial image to those of users registered in a central server or database, in order to identify the second (e.g. remote) user. Based on this identification, communication between the mobile communication device of the first user and a mobile communication device of the second (e.g. remote) user may be established, and interaction between the first and second users may be thus facilitated.

It may be the case that the second (e.g. remote) user does not have a suitable mobile communication device, or the mobile communication device of the second user may not be registered for this type of interaction. In these cases, a central server or database may be consulted to determine a third user who is present at the second location and who has a suitable mobile communication device which may be lent to the second user. To enable this determination, it may be necessary to classify users according to physical location, since borrowing a mobile device requires the lending and borrowing users to reside in the same location. The physical location may be specified by each user in a registration step (e.g. when the second user and the third user register to a registration server, as illustrated in FIG. 3). Then when the system attempts to determine a lending user for the identified second user in the second location, the registration database will be checked for an additional user at the second location who has a suitable mobile device that could be lent to the second user. In this way, the device borrowing interaction illustrated in the steps of FIG. 5 and shown visually in FIG. 1*b* may be supported for a scenario with multiple users spread across multiple physical locations.

Note that the absolute physical location of users could be stored in the registration database and used to determine which users are in the same physical location for the purpose of device borrowing. Alternately, it may be sufficient to classify users into location groups (group 1, group 2, group 3) for which the system may not know any absolute physical location.

Further Embodiments

Further embodiments may be added to enhance the previous embodiments, such as:

- Providing a permanent background processing of persons in the session area for face capturing/extraction of face features (face recognition), with features extracted locally on devices, or by a (distributed) server or a mix of these approaches; and maintaining a ready-to-use—possibly optimal—features set for a person at registration time.
- Optimality criteria of extracted features may be based on face-to-camera distance when face image(s) is/are taken, or based on time period, lighting conditions, camera sensor quality (picture resolution), and a more optimal image or features may trigger the replacement any previous suboptimal image or features for the related person by the new set. At time of registration of that person to become a participant, the more optimal image or feature set may then be used for registration identification and information.
- automatic cleanup of registered participants in the registration data. This may be especially useful for participants being registered without any associated device, and that may leave the session area after a while.

Such cleanup may, for example, be based on:

- Delay period: after a number of minutes, a registered participant (with no registered device) may be removed from the system (that case is for instance: a registered participant being targeted once by another for interaction, and that leaves the place thereafter).
- Automatic image parsing: all exchanged images in the interactive session are analyzed for face detection and identification (all of them). A list of recently seen (face) users is then maintained, with mention of users having an associated device or not. After a while (e.g., after a delay of a number of minutes) any unobserved registered face corresponding to a participant having no associated device would be unregistered from the session.
- automatic cleanup of registered devices. This may be especially useful for registered devices being switched off or quitting the application using the interactive sessions brutally without proper unregistering of the device and the participant:
- some presence polling task may be done between the session management and the registered devices. In case a polled device is not responding, then after a delay (or a few un-responded contacting attempts R) then the session management would unregister both that device AND its associated participant.

Embodiments S1 and S2: Adding Participant and Device Pose Management in a Mixed Reality Context The previously described embodiment S0 is focused on participant identity and participant device to participant link management.

However, in the case of a more complex embodiment wherein an interactive session related to a mixed reality experience (MR) is managed, a more complex variant of embodiment S0 described previously is desirable. The reason is that MR experience is based on virtual scene rendering that may involve adding some virtual elements precisely attached in the real world, and this in turn is requiring the Augmented Reality (AR) devices to relocate in the real world and share also the virtual environment to render and its attached coordinate system. In the context of MR, the pose, being the location and orientation in virtual scene, of the AR devices matters, to ensure a consistent and correct rendering of virtual objects amongst devices.

In previously described embodiments, no assistance was provided to devices to estimate to which set of registered devices they are pointing at (or which registered devices are in view), and this is also a desirable feature to help filtering candidate participant devices and participants when a participant want to trigger some interaction with another participant.

In an embodiment S1 that extends (completes) the S0 embodiment, the devices are able to locate themselves spatially accurately and with temporal stability, compatible with an MR experience (i.e., there is no drift in pose estimation while moving around these devices in the related scene).

Another embodiment S2 is a fallback of the S1 embodiment, where only the managing system (using a server or a distributed service) would be in charge of periodically re-estimating each participant device's pose based on periodic polling of an image captured by the rear-facing camera of each device. Such embodiment may be less efficient with possibly some impact on the overall accuracy of device's pose estimation, due to probable delays caused by image transfer and the related processing and network load; however, recent progress in 5G network technology makes such approach feasible.

Device Localization

In another embodiment S2 that also extends the embodiment S0, the device localization may be done using image based localization (but other approach may be used to obtain similar result): as soon as a device has joined the session and the session management has acquired an image from one of the cameras of the device used, which enables re-localization (using image based localization), then the localization of the device is updated and may be shared among devices or be managed in a centralized manner, depending on preferred options regarding how to assist participant target (invitee) selection, and filtering of targeted device(s).

The embodiment S2 fits the case when devices are not able to locate themselves in their environment, or are not able to do so accurately: then, a dedicated pose estimation service may, in loop—during the lifetime of the session—process images from devices identified with the related device ID:

- Recent images taken by the rear-facing camera of each device (the more recent the better for the pose estimation accuracy),
- Device ID being the unique one obtained from registration step
- Build—and possibly update—its own scene model based on received smartphones' images taken using their back camera(s),
- Estimate and update each device's pose with respect to its scene model Once localized, each device in the S2 embodiment may participate in a mixed reality experience, with the limitation mentioned above (e.g., low (re-)localization accuracy expected, due to a low polling rate used to avoid network congestion that may occur when all devices send images for (re-)localization.

According to a particular embodiment of the S1 embodiment, the participating devices first have to localize themselves individually, (using their own local coordinate system to map their environment), as they join the interactive session, or before joining.

Then, an explicit information is required, to enable each device to map its local coordinate system to one shared amongst devices connected to the session by computing a transformation/translation between the two coordinate systems.

That computation may be done on the server side according to an embodiment. The computation requires knowledge of a specific shared common Spatial Reference Location (SRL), of which the description information is typically acquired by the device when joining the session.

The SRL may correspond to both a real-world position and to a 3D axis attached to it. The SRL may serve to place and orient a virtual scene (by overlapping (a) specific virtual 3D point(s) and axis to the real-world ones of the SRL). The SRL may be retrieved from physical 2D marker(s), or 3D spatial location, precisely identified through specific descriptors (visual features) that are non-ambiguous relatively to the device's environment (the scene). Once the SRL is identified by a device, and localized in its local coordinate system, it is possible to do the computation of required transformation/translation passing from that local unique coordinate system to the common coordinate system used by the server and shared amongst devices.

The initial set up of the shared SRL (including an attached coordinate system to defined axes) may be achieved in various ways, such as:

- Defined by the first device-equipped user when its device is creating (or joining) the interactive session, at registration time,
  - Then that device may:
    - (in a server-centric approach) upload the newly defined SRL to the server that would share the SRL with devices joining the related session later,
    - (in a distributed approach) share/forward the newly defined SRL to any devices joining the related interactive session
- Or: Provided by the server managing the session (in case that a predefined spatial location is identified or is attached to the local environment where the session is taking place)

For instance, a specific SRL may be defined once for all for a specific AR room in a leisure complex place, for instance, and all participants would load that room-specific-SRL when joining a related session.

The S1 embodiment fits the case of devices being able to create and maintain a temporary mapping of their 3D environment using dedicated sensors and software (Apple's ARKit®, Google's ARCore® for instance), in a short-lived coordinate system. Such temporary mapping may be expected to be started when the application is started, before joining the interactive session, and to be terminated when leaving that same interactive session.

When joining the session, these devices may receive the shared SRL information that is required to compute the operation to transform/translate their pose information in their local but private coordinate system to the shared coordinate system, enabling the devices to (re-)locate with each other (with consistent location and orientation).

Assisted Interaction Setup with Globally Localized Devices

In the context of the S1 and S2 embodiments, the more or less accurate pose (i.e. both the localization and orientation) of each device in a session is available in a centralized or distributed approach, depending on the embedded S0 embodiment used.

The pose information is then used to assist the participant identification steps in the case of some interaction is wanted between participants (or between a participant (registered) and a not yet participant (not yet registered)). A process similar to the target user identification and the notification process as described in the previous sections may be applied.

Figure 9:
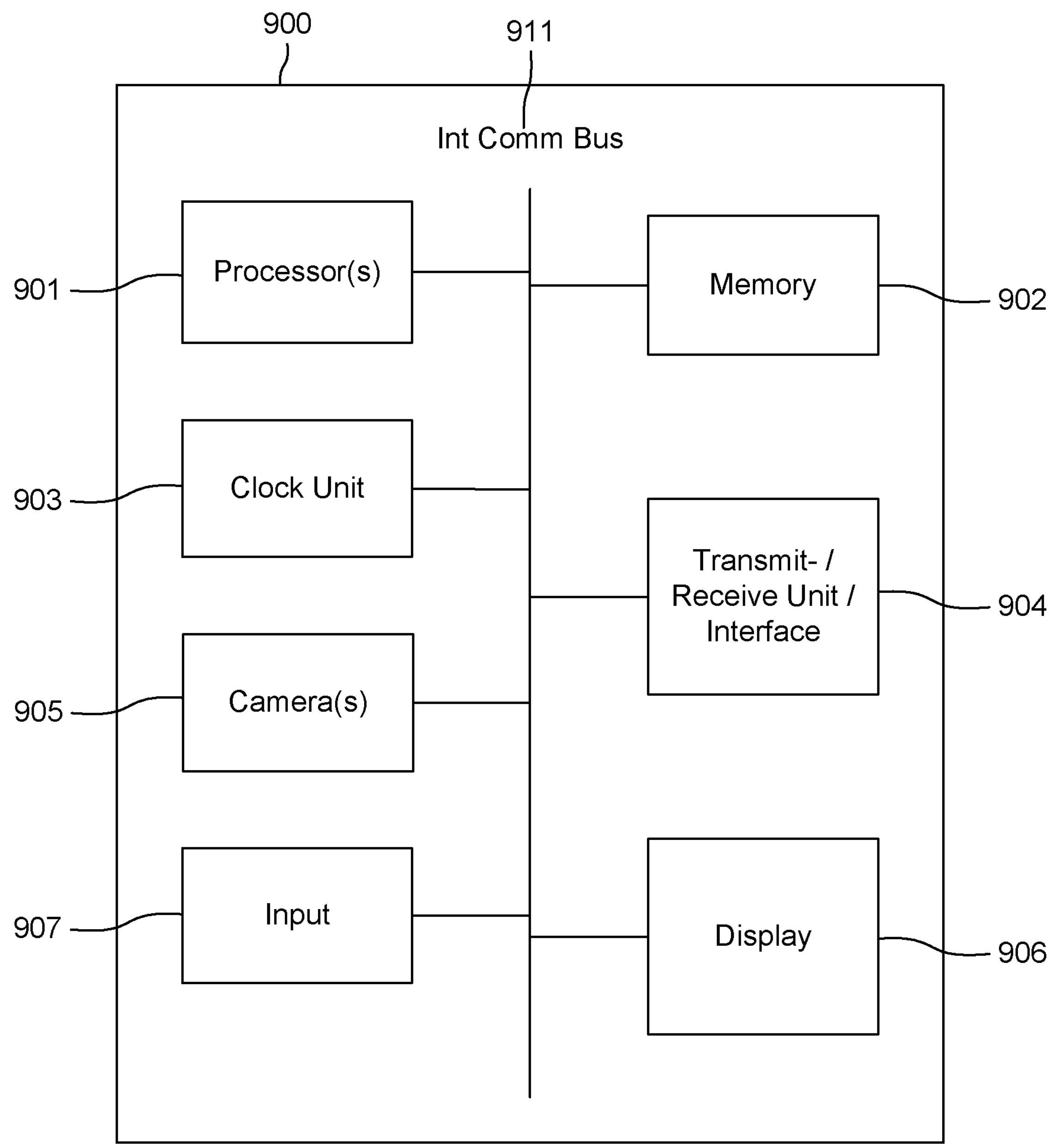
FIG. 9 is an exemplary embodiment of a communication device.

FIG. 9 is an exemplary embodiment of a communication device that may be used in any of the described embodiments. The communication device may include one or more central processing units or processors 901, one or more memories 902, a clock unit (903), one or more transmit- and receive interfaces (transceiver) (904) such as according to 3GPP, Ethernet, WiFi, Zigbee, or Bluetooth, and one or more camera(s) (or image capturing arrangement) 905, an input interface 907 for user input, and a display 906 for rendering images and rendering a User Interface. Elements 906 and 907 may be combined in a single arrangement, e.g., a tactile display. The functions in device 900 may communicate with each other using a central communication bus 911. The communication device may be a User Equipment (UE) or Wireless Transmit-/Receive Unit (WTRU). The first communication device (900, 101) may establish a communication with a second communication device (900, 121). The memory, the at least one image capturing arrangement, the at least a transceiver, and the at least one processor are configured: to capture a first image of a first person (e.g., 11);

to identify the first person (e.g., 11) by matching features of the first image to stored features of further images; to retrieve information related to a communication device associated with the identified first person (e.g., 11), and on condition that no communication device is associated with the identified first person (e.g., 11): to select a second communication device (e.g., 121) associated with a second person (e.g., 12), and to transmit, to the selected second communication device (e.g., 121), a request to handover the selected second communication device (e.g., 121) to the first person (e.g., 11) and to establish a communication between the first communication device (e.g., 101) and the second communication device (e.g., 121) when it is detected that the second communication device (e.g., 121) is handed over to the first person (e.g., 11) corresponding to the first image.

According to an embodiment, the detecting that the second communication device (121) is handed over to the first person (11) comprises capturing, by the second communication device, a second image of the first person (11), and matching features of the second image to features of the first image.

According to an embodiment, the selecting of a second communication device (121) associated with a second person (12) comprises determining whether the second person (12) is in proximity of the first person (11).

According to an embodiment, the determining whether the second person (12) is in proximity of the first person (11) is based on the first image.

According to an embodiment, the request to handover the selected second communication device (121) to the first person (11) comprises transmitting the first image of the first person (11) to the selected second communication device (121) and displaying, by the second communication device, the first image.

According to an embodiment, the request to handover the selected communication device (121) to the first person (11) comprises transmitting, to the selected second communication device (121) information representative of a location of said first person (11).

According to an embodiment, the information representative of a location of the first person (11) is directional information, being any of a textual message or an arrow.

Figure 10:
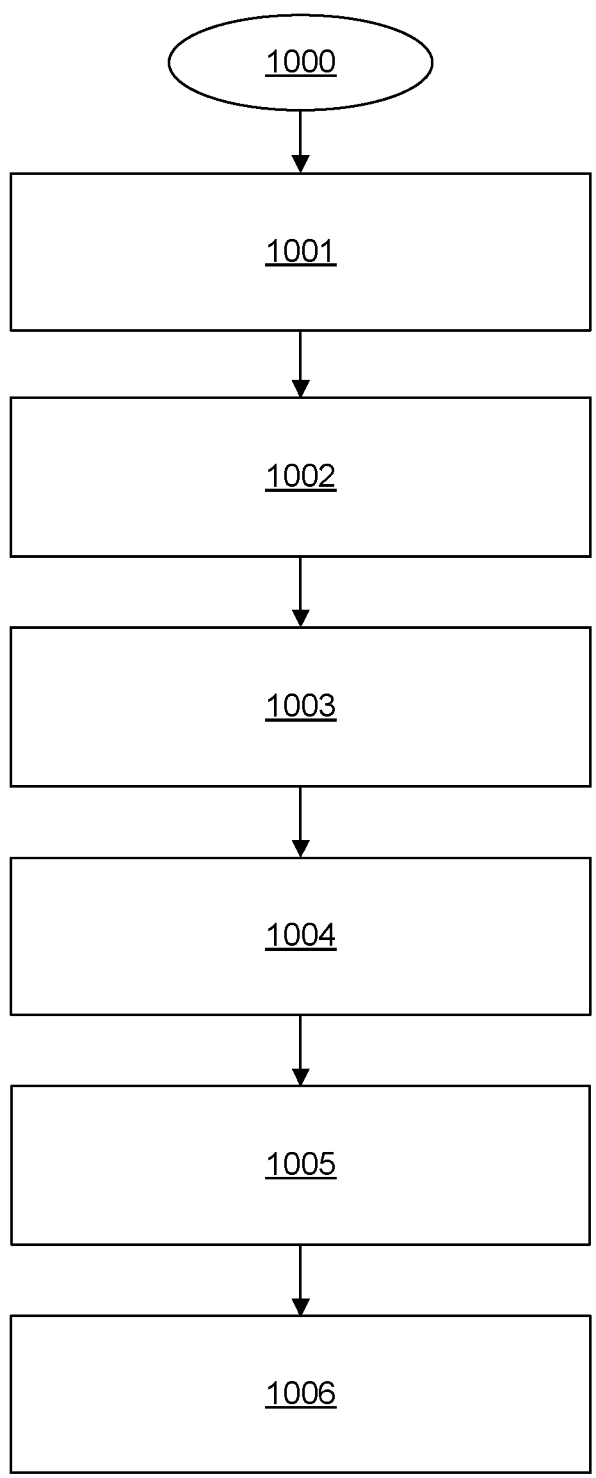
FIG. 10 is a flow chart of an embodiment of the method for communication.

FIG. 10 is a flow chart of an embodiment of the method for establishing a communication between a first and a second communication device. In 1001, by the first communication device (e.g., 101), a first image of a first person (e.g., a participant 11), is captured by the first communication device. In 1002, identifying (1001) the first person by matching features of the first image to stored features of further images. The features may be face features, e.g., for face recognition or other image features, such as interest points, Scale-Invariant Feature Transform (SIFT), Speeded Up Robust Features (SURF) blobs, edges or any other features that enable to compare images. In 1002, information is retrieved related to a communication device associated with the identified first person. The information may be an identifier of an associated communication device. The information may be retrieved from the first device, from other devices, or from a centralized server, e.g., from a participant registration database. In 1003, on condition that no communication device is associated with the identified first person, a second communication device (e.g., 121) associated with a second person (e.g., 12) is selected, 1004, and a request to handover the selected second communication device (e.g., 121) to the first person (e.g., 11) is transmitted, 1005, to the selected second communication device (e.g., 121) and, when detecting that the second communication device (e.g., 121) is handed over to the first person (e.g., 11) corresponding to the first image, a communication is established (set up), 1006, between the first communication device (e.g., 101) and the second communication device (e. g., 121).

According to an embodiment, the memory, the at least one image capturing arrangement, the at least a transceiver, and the at least one processor are further configured to determine whether the second person (12) is in proximity of the first person (11) when selecting a second communication device (121) associated with a second person (12).

According to an embodiment, the determining whether the second person (12) is in proximity of the first person (11) is based on the first image.

According to an embodiment, the memory, the at least one image capturing arrangement, the at least a transceiver, and the at least one processor are further configured to transmit the first image of the first person (11) to the selected second communication device (121) in the request to handover the selected second communication device (121) to the first person (11).

According to an embodiment, the memory, the at least one image capturing arrangement, the at least a transceiver, and the at least one processor are further configured to transmitting, to the selected second communication device (121) information representative of a location of said first person (11) in the request to handover the selected communication device (121) to the first person (11).

According to an embodiment, the information representative of a location of the first person (11) is directional information, being any of a textual message or an arrow.

According to an embodiment, the memory, the at least one image capturing arrangement, the at least a transceiver, and the at least one processor are further configured to precede the establishing of a communication between the first communication device (101) and the second communication device by transmitting, from the first communication device to the second communication device, an image of a person associated with the first communication device (101), and receiving from the second communication device (121) an indication that the establishing of a communication between the first communication device (101) and the second communication device is accepted (121).

It is to be appreciated that some elements in the drawings may not be used or be necessary in all embodiments. Some operations may be executed in parallel. Embodiments other than those illustrated and/or described are possible. For example, a device implementing the present principles may include a mix of hard- and software.

It is to be appreciated that aspects of the principles of the present disclosure can be embodied as a system, method or computer readable medium. Accordingly, aspects of the principles of the present disclosure can take the form of an entirely hardware embodiment, an entirely software embodiment (including firmware, resident software, micro-code and so forth), or an embodiment combining hardware and software aspects that can all generally be defined to herein as a “circuit”, “module” or “system”. Furthermore, aspects of the principles of the present disclosure can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. Some or all aspects of the storage medium may be remotely located (e.g., in the 'cloud'). It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method for establishing a communication between a first communication device and a second communication device, the method comprising:
- capturing, by the first communication device, a first image of a first person;
- identifying the first person by matching features of the first image to stored features of further images;
- retrieving information related to a communication device associated with the identified first person;
- on condition that no communication device is associated with the identified first person:
  - selecting a second communication device associated with a second person, and transmitting, to the selected second communication device, a request to handover the selected second communication device to the first person and establishing a communication between the first communication device and the second communication device when detecting that the second communication device is handed over to the first person corresponding to the first image.

2. The method according to claim 1, wherein said detecting that the second communication device is handed over to the first person comprises capturing, by the second communication device, a second image of the first person, and matching features of the second image to features of the first image.

3. The method according to claim 1, wherein the selecting of a second communication device associated with a second person comprises determining whether the second person is in proximity of the first person.

4. The method according to claim 3, wherein the determining whether the second person is in proximity of the first person is based on the first image.

5. The method according to claim 1, wherein the request to handover the selected second communication device to the first person comprises transmitting the first image of the first person to the selected second communication device and displaying, by the second communication device, the first image.

6. The method according to claim 1, wherein the request to handover the selected second communication device to the first person comprises transmitting, to the selected second communication device, information representative of a location of said first person.

7. The method according to claim 6, wherein said information representative of a location of the first person is directional information, being any of a textual message or an arrow.

8. The method according to claim 1, wherein the establishing of a communication between the first communication device and the second communication device is further preceded by transmitting, from the first communication device to the second communication device, an image of a person associated with the first communication device, displaying, on the second communication device the image of the person associated with the first communication device when detecting that the second communication device is handed over to the first person corresponding to the first image, and receiving from the second communication device an indication that the establishing of a communication between the first communication device and the second communication device is accepted.

9. A first communication device for establishing a communication with a second communication device, the first communication device comprising a memory, at least one image capturing arrangement, at least a transceiver, and at least one processor configured to:
- capture a first image of a first person;
- identify the first person by matching features of the first image to stored features of further images;
- retrieve information related to a communication device associated with the identified first person, and on condition that no communication device is associated with the identified first person:
- select a second communication device associated with a second person, and transmit, to the selected second communication device, a request to handover the selected second communication device to the first person and establish a communication between the first communication device and the second communication device when it is detected that the second communication device is handed over to the first person corresponding to the first image.

10. The first communication device according to claim 9, wherein the memory, the at least one image capturing arrangement, the at least a transceiver, and the at least one processor are further configured to determine whether the second person is in proximity of the first person when selecting a second communication device associated with a second person.

11. The first communication device according to claim 10, wherein the determining whether the second person is in proximity of the first person is based on the first image.

12. The first communication device according to claim 9, wherein the memory, the at least one image capturing arrangement, the at least a transceiver, and the at least one processor are further configured to transmit the first image of the first person to the selected second communication device in the request to handover the selected second communication device to the first person.

13. The first communication device according to claim 9, wherein the memory, the at least one image capturing arrangement, the at least a transceiver, and the at least one processor are further configured to transmitting, to the selected second communication device, information representative of a location of said first person in the request to handover the selected second communication device to the first person.

14. The first communication device according to claim 13, wherein said information representative of a location of the first person is directional information, being any of a textual message or an arrow.

15. The first communication device according to claim 9, wherein the memory, the at least one image capturing arrangement, the at least a transceiver, and the at least one processor are further configured to precede the establishing of a communication between the first communication device and the second communication device by transmitting, from the first communication device to the second communication device, an image of a person associated with the first communication device, and receiving from the second communication device an indication that the establishing of a communication between the first communication device and the second communication device is accepted.

* * * * *